2,842,451

AQUEOUS VEHICLES FOR FORMING WATER-RESISTANT FILMS

Oliver J. Grummitt and Albert A. Arters, Cleveland, Ohio, assignors to The Sherwin-Williams Company, Cleveland, Ohio, a corporation of Ohio No Drawing. Application December 23, 1954
Serial No. 477,396

14 Claims. (Cl. 106—194)

This invention relates, as indicated, to certain novel aqueous vehicles from which may be formed films, which upon drying become resistant to water and soap and ammonia solutions.

In its more specific aspects, this invention relates to certain films obtained by the inter-action of carboxymethyl cellulose acids and zirconium compounds which form at ordinary temperatures and become water-resistant.

Many materials are known which are soluble in water and therefore useful in making brushable and spraying compositions from which may be formed either pigmented or unpigmented films for the purpose of protectively or decoratively coating various surfaces. The primary objection to these materials, particularly from the standpoint of interior decoration, is the lack of resistance of the films to the solvent effects of water and various soap solutions normally used to clean the coated surface.

It is a primary object of this invention, therefore, to provide an aqueous vehicle for use in either the clear or pigmented form for protectively or decoratively coating a surface, which vehicle is characterized in that films formed therefrom upon drying under conditions of normal atmospheric temperature and humidity become resistant to water and alkali or soap or alkaline solutions normally used to clean the surface.

Prior art methods for effecting improvement in the resistance to water of films formed from such water-soluble film-forming material have generally proceeded along the line of de-sensitizing a coated surface to the effects of water by treatment involving either chemical or heat treatment after the film has been formed on the surface.

Chemical methods for treating coated surfaces have involved washing the dried film with solutions containing acidic salts, mineral acids, aldehydes, dimethylol urea, and certain catalytic materials which cause a chemical change to occur in the film itself.

A further object of this invention is to provide a vehicle which requires no heat or chemical treatment to set the film or induce insolubility in the film, and also one which will not appreciably increase or decrease in viscosity on storage over a considerable period of time, i. e., several months.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that film-forming vehicles containing carboxyl-methyl cellulose acids and certain zirconium compounds yield films which on drying become resistant to the solvent effect of water.

Broadly stated, therefore, this invention is in the provision of a homogeneous aqueous solution comprising:

(a) Carboxymethyl cellulose acids, and
(b) A complex zirconium reaction product said aqueous solution having a pH within the range of from in excess of 7.5 and less than 9.

It will be seen, therefore, that the homogeneous compositions of this invention are comprised of three essential components. The first of these is the water-soluble film-forming compound comprising carboxymethyl cellulose acids which by itself will form a film from an aqueous solution but which remains water-sensitive unless treated in accordance herewith.

The second essential component is a complex ammonium-zirconium-carbonate material. The groups are derived from water-soluble zirconium salts, ammonium carbonate and ammonium hydroxide. The ratio of the several characterizing groups to each other may or may not conform to the ratios indicated by the known ammonium zirconyl carbonate, $(NH_4)_3HZrO(CO_3)_3$.

The third essential ingredient in which the previous two products are dissolved or dispersed is water.

The water-soluble film-forming material useful herein comprises carboxymethyl cellulose acids. Carboxylmethyl cellulose acids are not available commercially. It is necessary, therefore, to prepare the carboxymethyl cellulose acids from commercial sodium carboxymethyl cellulose and the procedure employed herein is one well known to those skilled in the art.

Typical commercial sodium salts of carboxymethyl cellulose have 0.7–1.2 of the hydrogen atoms of the 3.0 hydroxyl groups in each anhydroglucose unit replaced by $—CH_2COONa$. Thus there are 0.7–1.2 carboxyl groups and 2.3–1.8 hydroxyl groups remaining in each unit. The free acid form of a carboxymethyl cellulose is obtained by passing the sodium salt through a cationic type of ion exchange resin. This ion exchange resin may be made from the sodium salt of a sulphonic acid type of resin which has been treated with acid to give the free acid form.

A solution containing 3.6% of the sodium salt of carboxymethyl cellulose acids with a substitution of 0.7–0.85 carboxyl groups was passed downward through a glass column 2 feet high and 2 inches in diameter, which contained about 63 cubic inches of the free acid form of the sulphonic acid type of resin. Under a vacuum of 20–80 mm. the rate of flow was about 20 ml. per minute. The concentration of carboxymethyl cellulose acids in the filtrate was determined by titration with standard alkali and by evaporating weighed samples to dryness at 60° C.–65° C./50 mm. for 1 hour. The concentration of acids in this solution was adjusted by dilution with water or by vacuum concentration at room temperature, and it was this solution which was used in the preparation of the coating compositions of Examples I through X. As a mold inhibitor, 0.1% of phenol was added. This carboxymethyl cellulose acids material is dispersible in water to an extent sufficient to yield satisfactory filming properties, but without the treatment herein described remains subject to attack by water and water solutions, e. g., soap and ammonia solutions.

As stated before, it is preferred to form the complex zirconium compounds within the reaction mixture. Examples of a few of the water-soluble zirconium salts useful in such an in situ reaction are zirconium oxychloride octahydrate, zirconium tetrachloride, zirconium acetate, zirconium sulphate and zirconium nitrate, etc. These salts, after reaction with carboxymethyl cellulose acids, are then reacted with ammonium carbonate and ammonium hydroxide to form the vehicle.

Although the chemistry of the reaction involved here is not known, it is believed that the ions supplied by the zirconium-ammonium-carbonate complex combine with the carboxymethyl cellulose acids in a unique manner to form the desired film-forming material which on drying is resistant to water and alkali.

The source of these ions may be commercially available ammonium zirconyl carbonate $(NH_4)_3HZrO(CO_3)_3$. However, the films obtained from the vehicles incorporating ammonium zirconyl carbonate, while being useful, are not as satisfactory as the films formed from vehicles incorporating ammonium, zirconyl and carbonate ions supplied from various compounds or materials.

Even though the commercial ammonium zirconyl carbonate does supply the type of ions necessary for the present reaction (ammonium, carbonato zirconyl and carbonate), these ions are all present in a ratio established by the composition of the source. Thus, the reaction of carboxymethyl cellulose acids with the ions supplied by the ammonium zirconyl carbnate is different from the reaction of carboxymethyl cellulose acids with the ions supplied by the separate materials, e. g., water-soluble zirconium salts, ammonium carbonate and ammonium hydroxide. This is indicated by the fact that films using the commercial product do not exhibit water-resistance to the same degree as the films utilizing the in situ product.

It should be noted at this point that when commercial ammonium zirconyl carbonate is used, ammonium, carbonato zirconyl and carbonate ions are supplied. However, when the complex zirconium reaction product is formed in situ, ammonium, zirconyl and carbonate ions are present. Whatever carbonato zirconyl ions are present in the in situ reaction, are ones which are formed after the addition to the original ions.

The preferred embodiment of this invention, then, embraces the formation of the reaction product formed by the reaction of polyacrylic acid with ammonium, zirconyl and carbonate ions, which ions have been supplied from water-soluble zirconium salts, ammonium carbonate and ammonium hydroxide.

It becomes convenient to illustrate the invention by giving specific examples of compositions embodying the invention and the mode of compounding and using them, such examples being, however, for the purpose of illustrating the invention and not limiting it to the precise scope of such examples.

*Example I*

This example describes a typical preparation of a coating composition which produces films of satisfactory insolubility. To a 100 ml. solution containing 4.4% of carboxymethyl cellulose acids (0.8 carboxyl) there are added with vigorous mechanical stirring 3.0 g. of solid zirconium oxychloride octahydrate, and stirring is continued until the thick slurry is homogeneous. This intermediate product is then treated with 8 grams of powdered ammonium carbonate and after frothing and gelling, all solid material disappears and the mixture becomes liquid. To this mixture are added 3.0 ml. of concentrated ammonium hydroxide. The pH of the mixture at this point is 8.8–9.0. Ammonium hydroxide is used herein because it is a volatile base which aids in curing the film. The above mixture has a zirconium/carboxyl ratio of 0.5, based on 0.8 carboxyl group per anhydroglucose unit in the carboxymethyl cellulose acids.

This zirconium/carboxyl ratio is based on the equivalents of zirconium and carboxyl groups present with the carboxyl content of the carboxymethyl cellulose being determined from its neutralization equivalent. Typical of the various pigments or mixtures of pigments which may be used is finely ground mica. When 28 grams of a pigment grade of mica were added to the mixture, the resulting viscosity of the product was 9 seconds (Sherwin-Williams viscosity cup No. 4 orifice).

In this example, 3.0 grams of solid zirconium oxychloride octahydrate was employed. If other water-soluble zirconium salts are used in place of the zirconium oxychloride octahydrate, the amount employed is calculated to supply approximately 1.14 parts by weight of zirconium dioxide in the form of the water-soluble zirconium salt.

When this coating material was applied to a surface such as paper, wallboard or wood and the water allowed to evaporate, a film of very high reflectance was formed, which was not affected by 20 wipes of a detergent solution after one week's drying. The mixture formed in Example I also possessed satisfactory heat and freeze-thaw stability.

A heat stability test run on a coating composition consists of heating a sample sealed in a can or flask in an oven at 60° C. for a period of 72 hours. A freeze-thaw test consisted of subjecting a similar sample to three cycles of freezing at −10° C. and warming to room temperature after each freezing. A satisfactory composition is one which shows no change in viscosity, which would be indicative of physical and/or chemical alteration in the mixture. Furthermore, the films produced by samples subjected to these temperature extremes should be in no way different than the films from the original composition.

When reference is made herein to detergent solution resistance, or wash tests, it is meant that detergents such as polyphosphates and the ammoniated variations thereof in aqueous solutions at about 1% concentration and at a temperature of about 50° C. are used in scrubbing the air-dried films. A film of satisfactory washability does not change in appearance after 10 wipes with a detergent solution after one week of drying.

A sponge is used to apply the water or detergent solution to the film being treated and scrubbing is done with moderate pressure is series of ten wipes which are all in the same direction. If the film does not fail during the first ten wipes, three minutes are allowed to elapse and a second series of ten wipes is conducted. This routine of ten wipes with a three minute interval before the next 10 wipes is continued until the film fails. A film is deemed to have failed when its appearance begins to change. As a practical matter, the test is concluded at the end of fifty wipes.

*Example II*

Following a procedure similar to that of Example I, but employing a less concentrated carboxymethyl cellulose acid solution, 1.8 g. of zirconium oxychloride were added to 100 ml. of 2.8% carboxymethyl cellulose acids (zirconium-carboxyl ratio of 0.50), then 5 grams of ammonium carbonate to liquify the mixture and 2.0 ml. of concentrated ammonium hydroxide to raise the pH to 9.0. 25 grams of a pigment grade of mica were added to give a product that had a viscosity of 8 seconds (Sherwin-Williams cup No. 4 orifice) and one which had satisfactory heat and freeze-thaw stability. Films formed from the composition of Example II withstood 6 wipes of a detergent solution after one week of drying. The reduced washability in this case as compared to Example I is probably due to the thinner film which is formed.

*Example III*

In order to show that the films produced by the compositions of Examples I and II depend upon a chemical interaction of the carboxymethyl cellulose acids and zirconium compounds, films were prepared from 100 ml. of 2.8% carboxymethyl cellulose acids and 1.0 ml. of concentrated ammonium hydroxide plus 24 grams of pigment grade mica. Films cast from this product did not withstand 6 wipes with a detergent solution after one week of drying. This sensitivity to water in comparison with the more durable films of the previous and subsequent examples clearly illustrates that the zirconium compound plays a vital role in film formation.

Example IV

In this example, the zirconium/carboxyl ratio was reduced from 0.5 to 0.33, with glycerol being added to plasticize and increase the washability of the film. The zirconium was provided in this example from the zirconium oxychloride octahydrate and ammonium zirconyl carbonate. In this example, 200 ml. of 2.8% carboxymethyl cellulose acids was reacted with a solution of zirconium oxychloride (10% of $ZrO_2$) to provide a zirconium/carboxyl ratio of 0.22. To this mixture was added 5 ml. of glycerol. This mixture was then added to the carboxymethyl cellulose solution and 5 ml. of ammonium hydroxide plus a quantity of commercial ammonium zirconyl carbonate equal to a zirconium/carboxyl ratio of 0.11 were added. This gave a final zirconium/carboxyl ratio of 0.33. Films cast from the composition of this invention on paper withstood 6 wipes of a detergent solution after only 1 day of drying. After 3 days of drying, the films did not fail until after being wiped 12 times with the detergent solution.

Example V

The value of glycerol and other polyalcohols in increasing the washability and plasticizing the film is further illustrated in this example. Other polyalcohols which are approximately equivalent to glycerol in their performance in these compositions include ethylene glycol, pentaerythritol, sorbitol and mannitol. The preferred alcohols are those containing from 2 to 6 alcoholic hydroxyl groups and although polymeric alcohols, such as polyvinyl alcohol, may be employed, they are not entirely satisfactory because the compositions in which they are included are cloudy and the films formed therefrom appear to be less resistant to water. In a series of experiments starting with 200 ml. of 2.8% carboxymethyl cellulose acids in which the zirconium/carboxyl ratio was held constant at 0.33 and zirconium oxychloride octahydrate was the sole source of zirconium, with the compositions being brought to the neutral or alkaline state with ammonium carbonate and ammonium hydroxide, it was found that where no glycerol was present, 14 days of drying were required before the films cast therefrom would withstand only 6 wipes of the detergent solution. The addition of 1, 3 or 5 ml. of glycerol gave films which after aging only one day could be wiped with detergent solutions 6 times. Films were applied to paper and then flexed in order to observe the flexibility of the film. These compositions appeared to have greater flexibility than compositions not containing glycerol as the plasticizer. Longer drying periods and more vigorous washing with the detergent solution indicated that the optimal quantity of glycerol was approximately 3 ml. In place of the glycerol, sorbitol was used as the modifying additive and the stability and films formed from this composition were equal to the composition containing glycerol.

Example VI

In the preceding examples, the zirconium/carboxyl ratio has ranged from 0.33 to 0.5. The effect of this variable on film characteristics was further studied in a series of experiments with a ratio which varied from 0.05 to 1.0. As in the previous examples, the materials employed are carboxymethyl cellulose acids, zirconium oxychloride octahydrate, with or without the addition of ammonium zirconyl carbonate, ammonium hydroxide, ammonium carbonate and, in certain cases, glycerol. Washability tests or detergent resistant tests showed that the zirconium/carboxyl ratios of 0.15 and lower yielded films which were relatively sensitive to water and therefore not satisfactory.

In general, the effect of increasing the zirconium/carboxyl ratio from 0.15 to 1.0 was to improve the water resistance of the films cast from such compositions. At a ratio of 1.0, for example, a composition made from carboxymethyl cellulose acids, zirconium oxychloride octahydrate, ammonium carbonate and glycerol was not affected by 6 wipes with the detergent solution after drying for approximately one week. It is concluded, therefore, from these experiments that the practical working range of zirconium/carboxyl ratio is from about 0.15 to 2.0. However, if other factors, such as viscosity, flow, cost, etc. are to be considered, then the optimal ratio is about 0.33 to 0.5.

It is to be noted that improvement in the water-resistance, detergent solution resistance, etc., of the carboxymethyl cellulose acids films begins at the very start of the addition of zirconium and continues to improve with the increase in the zirconium to carboxyl ratio. Although zirconium to carboxyl ratios of from about 0.05 to about 2 have been set as a working range, with from 0.1 to about 0.5 being preferred, a ratio of about 0.33 has been found to be substantially the optimum, all factors considered.

Example VII

In this example it was attempted to determine whether the formation of the films formed from the compositions of this invention depended to any degree upon oxidation of the carboxymethyl cellulose acids and its compounds with zirconium by the oxygen available through the air. This possibility was tested indirectly by comparing films both with and without cobalt driers. It was expected that if the addition of these driers increased the rate at which the films developed washability, this would be an indication that oxidation contributed to film formation.

Therefore, compositions were made from carboxymethyl cellulose acids, zirconium oxychloride octahydrate, ammonium hydroxide, ammonium carbonate and glycerol. To these compositions were added 0.1% of hexamine cobaltic nitrate, and the films cast from these compositions were examined in comparison with films from the same compositions made without the addition of a cobalt drier. No measurable difference was found in the rate of drying as determined by the usual wash tests. It was therefore concluded that film formation from these compositions does not depend to any important degree on oxidation by air.

Example VIII

The experiments conducted in this example were carried out to determine whether the carboxymethyl cellulose employed was superior in the free acid form to the sodium salt of carboxymethyl cellulose. Two series of experiments were conducted at zirconium/carboxyl ratios of 0.33 and 0.5 employing carboxymethyl cellulose acids in one and the sodium salt of carboxymethyl cellulose in the other and the washability of the films formed from such compositions tested. In every case, the films based on the compositions employing the sodium salts of carboxymethyl cellulose acids showed ready solubility in water and, in fact, none of these films attained a point where it would resist 12 wipes with water alone. The detergent solution was even more destructive to these films. It was therefore thought that the film formation in the case of carboxymethyl cellulose acids is due to an interaction or copolymerization between the carboxyl groups of carboxymethyl cellulose and the zirconium ions present. A change of the carboxyl group to a carboxylate anion, as in the case of the sodium carboxymethyl cellulose, interferes with the film-forming reaction.

Example IX

Several compositions were made in this example in which the zirconium oxychloride octahydrate was replaced with other water-soluble zirconium compounds such as zirconium sulphate and zirconium acetate. The use of the ammonium zirconyl carbonate, zirconium sulphate, or zirconium acetate as the source of zirconium yielded films of satisfactory washability. However, the preferred form of zirconium for the preparation of these novel compositions is from the zirconium oxychloride octahydrate material, with or without the addition of commercial ammonium zirconyl carbonate.

Example X

Although mica has been used as a pigment in the compositions of the preceding examples, others may also be used. For example, a composition was made from 100 ml. of 2.8% carboxymethyl cellulose acids, 4.8 ml. of zirconium oxychloride octahydrate solution (10% $ZrO_2$ content), 1.8 g. of glycerol, 10 ml. of 20% ammonium carbonate solution and 26 g. of a pigment grade of mica. Dried films formed from this composition showed high degrees of reflectance and after three weeks of drying these films were not affected by twenty wipes with a detergent solution. This composition also possessed satisfactory heat and freeze-thaw stability.

Other white pigments were used in the above compositions in place of the mica, such as titanium dioxide and lead acid phosphate. The viscosity, pH and other characteristics of the final compositions were essentially the same as in Example II. These compositions showed satisfactory heat and freeze-thaw stability, and the washability with detergent solution of the films formed therefrom one week old was satisfactory in comparison with similar films containing mica as the pigment.

The novel vehicles of this invention may be pigmented with one or more of a large number of white or colored inorganic or organic pigments. However, since the vehicle is alkaline, pigments of a strongly acidic character should not be used.

Examples of some of the white pigments useful herein are mica, titanium dioxide, lead acid phosphate, white lead, lithopone, lead silicate and lead cyanamide.

Examples of some of the colored pigments useful herein are the iron oxides, phthalocyanine blue, hansa yellow and the chrome yellows.

In place of the glycerol used in the above compositions, sorbitol was substituted as the modifying additive. The stability of these compositions and the films formed therefrom was equal to the compositions using glycerol.

The amounts of mica or other pigments added are not critical. When the quantity of pigment to the amount of carboxymethyl cellulose acids present is related, it is believed that satisfactory films may be obtained where the pigment-to-carboxymethyl cellulose acids ratio is in the range of from 3 to 1 to about 15 to 1.

Example XI

The carboxymethyl cellulose acids in these compositions may be varied in several ways. In Examples I and II, the concentration of the acids in the water solution was varied.

Commercially available acids (in the form of sodium salts) vary in carboxyl content from 0.7 to 1.2 carboxyl groups per anhydroglucose unit. The acids used in the preceding examples had a substitution of 0.7–0.85 carboxyl group. In this example, the acids used were higher in carboxyl content and they contained on the average, 1.2 carboxyl groups per anhydroglucose unit.

100 ml. of carboxymethyl cellulose acids solution containing 2.53% of acids by weight were reacted with 1.9 g. of zirconium oxychloride octahydrate. This gave a zirconium/carboxyl ratio of 0.5. The mixture was then allowed to react with 5.0 g. of ammonium carbonate and the pH adjusted to about 8.5 by the addition of 2.0 ml. of concentrated ammonium hydroxide. After the addition of 16 g. of mica pigment, the viscosity of the mixture was 16″. This composition produced dried films which were highly reflectant and were not affected by 20 wipes of the detergent solution after two weeks' drying.

It is to be emphasized that ammonium zirconyl complexes other than ammonium zirconyl carbonate may be employed herein. Examples of some of these complexes are the ammonium zirconyl salts of such acids as lactic, glycolic and mandelic. However, the ammonium, zirconyl, and carbonate ions are employed in the preferred embodiment of this invention.

Although only ammonium hydroxide has been shown as the volatile base used for increasing the alkalinity of the novel vehicles described herein, water solutions of certain volatile organic amines such as methyl amine, triethyl amine and morpholine may be used. However, for best results, the use of ammonium hydroxide is preferred.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A homogeneous aqueous solution consisting essentially of: (a) a free acid form of carboxymethyl cellulose, and (b) a complex zirconium reaction product formed from a water-soluble zirconium salt, ammonium carbonate and ammonium hydroxide, said aqueous solution having a pH within the range of from in excess of 7.5 to less than 9, the ratio of zirconium to carboxyl being in the range of from 0.15 to 2.

2. A homogeneous aqueous solution consisting essentially of: (a) a free acid form of carboxymethyl cellulose, and (b) a complex zirconium reaction product formed from a water-soluble zirconium salt, ammonium carbonate, ammonium hydroxide, and (c) ammonium zirconyl carbonate, said aqueous solution having a pH within the range of from in excess of 7.5 to less than 9, the ratio of zirconium to carboxyl being in the range of from 0.15 to 2.

3. The composition of claim 1 wherein the water-soluble zirconium salt is zirconium oxychloride octahydrate.

4. A homogeneous aqueous solution consisting essentially of: (a) a free acid form of carboxymethyl cellulose, and (b) ammonium, zirconyl and carbonate ions, said aqueous solution having a pH within the range of from in excess of 7.5 to less than 9, the ratio of zirconium to carboxyl being in the range of from 0.15 to 2.

5. A homogeneous aqueous solution consisting essentially of: (a) a 4.4% solution of a free acid form of carboxymethyl cellulose in water, (b) a water-soluble zirconium salt in an amount sufficient to yield a zirconium-to-carboxyl ratio of from about 0.15 to 2.0, (c) ammonium carbonate in an amount sufficient to liquify said mixture of carboxymethyl cellulose acids and zirconium salt, and (d) ammonium hydroxide in an amount sufficient to maintain the pH of said aqueous mixture in excess of 7.5 and less than 9.

6. A homogeneous aqueous solution consisting essentially of: (a) 100 parts by weight of a 4.4% solution of a free acid form of carboxymethyl cellulose in water, (b) 1.14 parts by weight of zirconium dioxide in the form of a water-soluble zirconium salt, (c) 8 parts by weight of ammonium carbonate, and (d) 3.0 parts by weight of ammonium hydroxide.

7. The composition of claim 5 where in the water-soluble zirconium salt is zirconium oxychloride octahydrate.

8. The method of making a stable homogeneous aqueous composition of a water-dispersible, film-forming material which comprises the steps of dispersing a free acid form of carboxymethyl cellulose in water, adding to said water dispersion of carboxymethyl cellulose acids a water-soluble zirconium salt with vigorous agitation, and in an amount sufficient to yield a ratio of zirconium to carboxyl in the range of from 0.15 to 2, continuing the agitation until the mixture is homogeneous, adding ammonium carbonate with agitation, continuing the agitation until all frothing and gelling has disappeared and the composition has become liquid, and adjusting the pH of the resultant composition to more than 7.5 and less than 9.

9. The method of claim 8 wherein the zirconium salt is zirconium oxychloride octahydrate.

10. The method of claim 8 wherein the zirconium salt is zirconium tetrachloride.

11. The method of claim 8 wherein the zirconium salt is zirconium acetate.

12. The method of claim 8 wherein the zirconium salt is zirconium sulphate.

13. The method of making a stable homogeneous aqueous composition of a water-dispersible film-forming material which comprises the steps of dispersing a free acid form of carboxymethyl cellulose in water, adding with agitation ammonium zirconyl carbonate to said water dispersion of carboxymethyl cellulose in an amount sufficient to yield a ratio of zirconium to carboxyl in the range of from 0.15 to 2, and adjusting the pH of the resultant composition of from more than 7.5 to less than 9.

14. A homogeneous aqueous solution consisting essentially of: (a) a free acid form of carboxymethyl cellulose, and (b) an ammonium-zirconyl salt complex of an acid selected from the group consisting of carbonic, glycolic, lactic and mandelic, said aqueous solution having a pH within the range of more than 7.5 to less than 9, the ratio of zirconium to carboxyl being in the range of from 0.15 to 2.

References Cited in the file of this patent

UNITED STATES PATENTS

| | | |
|---|---|---|
| 2,331,858 | Freeman et al. | Oct. 12, 1943 |
| 2,336,636 | Peterson | Dec. 14, 1943 |
| 2,420,949 | Hager et al. | May 20, 1947 |
| 2,716,615 | Voris | Aug. 30, 1955 |